United States Patent [19]

Mäder

[11] 4,133,575
[45] Jan. 9, 1979

[54] VIBRATION DAMPING MEANS FOR WINDSHIELD

[75] Inventor: Elmar Mäder, Bohlingen, Germany

[73] Assignee: ever-clean GmbH H.W. Nixdorf, Düsseldorf, Germany

[21] Appl. No.: 745,561

[22] Filed: Nov. 29, 1976

[30] Foreign Application Priority Data

Nov. 28, 1975 [DE] Fed. Rep. of Germany ....... 2553486

[51] Int. Cl.² .............................................. B60J 1/20
[52] U.S. Cl. ............................... 296/95 R; 248/206 R
[58] Field of Search ................. 296/84 R, 95 R, 84 B; 248/363, 206 R

[56] References Cited

U.S. PATENT DOCUMENTS

| | | | |
|---|---|---|---|
| 2,632,669 | 3/1953 | Piwczynski | 248/206 R |
| 2,657,893 | 11/1953 | Puckert | 248/206 R |
| 2,730,325 | 1/1956 | Van Dusen | 248/206 R |
| 2,940,713 | 6/1960 | Van Dusen | 248/206 R |
| 2,968,460 | 1/1961 | Van Dusen | 248/206 R |

*Primary Examiner*—Joseph F. Peters, Jr.
*Assistant Examiner*—R. Schrecengost

[57] ABSTRACT

A vibration damper for a windshield, comprising a suction-type mounting assembly having a suction cup consisting at least partially of resilient material and adapted to engage the internal surface of the windshield and to form therewith a peripheral seal; a bell member having a peripheral flange portion adapted to bear against the suction cup; and a fastener assembly accessible from the outside and acting between the central region of the suction cup and the bell member. The fastener assembly when tightened drawing the suction cup into the interior of the bell member for increasing the cavity between the internal surface of the windshield and the suction cup, whereby the mounting assembly adheres to the internal surface of the windshield and absorbs or at least substantially dampens vibrations occurring in the windshield.

11 Claims, 2 Drawing Figures

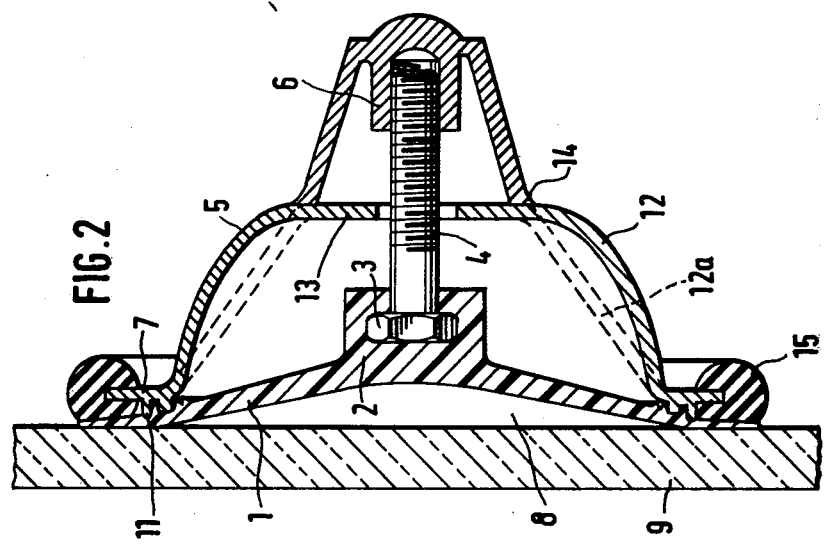
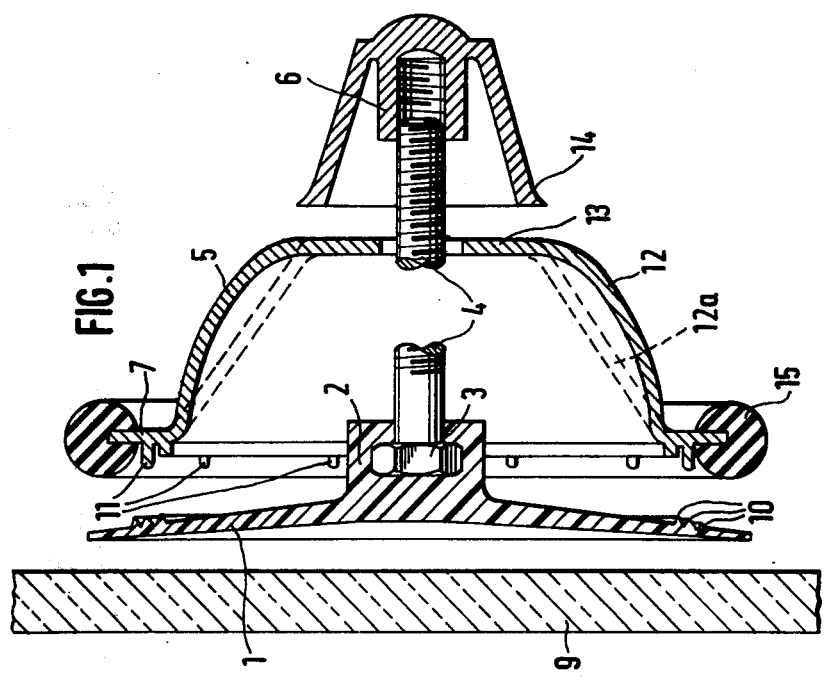

VIBRATION DAMPING MEANS FOR WINDSHIELD

The invention relates to a vibration damper for windscreens.

The windscreen of many vehicles is usually not joined to its bodywork frame directly, but through a resilient edge mounting. Nevertheless, the windscreen is always under a specific stress and the vibrations which inevitably occur during travelling, are necessarily transmitted to the screen. These vibrations in conjunction with the unilateral pressure applied by the wind to the normally curved windscreen frequently stress the latter close to the limit of its stressability so that the impact of even small stones may result in instant and complete destruction of the screen. The justifiably feared effect by which the entire windscreen is covered with honeycomb cracks and becomes practically opaque, so that the driver is compelled to continue travelling practically blind, occurs particularly with well-known single-pane safety glass windscreens which are prestressed in honeycomb configuration. The sensitivity of the windscreen increases substantially at low external temperatures and the risk of destruction is therefore particularly great in winter.

To reduce the dangers resulting from the above it is the object of the invention to dampen the vibrations of the windscreen but without calling for any change of its construction and its mode of anchoring and without impairing its operation and traffic safety.

This problem is solved by a vibration damper containing a plate of concave configuration which can be placed upon the internal surface of the windscreen and consists of resilient material, tapers towards its edge and in its middle surrounds the head of a screw in non-rotational manner, the shank of said screw extending through the middle of a bell, the outer edge of which bears upon the plate edge, and said shank extends into a nut which, on being tightened, draws the middle of the plate into the interior of the bell.

Vibrations of a disc-shaped component can be interrupted if one or more places of the internal surface of said component is or are retained or simply touched. Vibrations and counter-vibrations cannot then be transmitted without obstruction but instead cancel each other by absorption. According to the invention, therefore, the vibration damper is fixed at least at one place — as far as possible outside the plane of symmetry — so that all vibrations of any frequency are absorbed or are at least substantially attenuated. This contributes to substantial relaxation of the windscreen and has the effect that small stones striking the windscreen rebound off it without the said screen bursting in its entirety as would otherwise unavoidably be the case because of the condition of stress of the said screen. It is even possible for small impact perforations to be produced in the screen without the latter breaking in its entirety. Secondary accidents, which can be particularly serious in winter road traffic, are thus also prevented.

Other features of the invention are disclosed in the description hereinbelow and are the subject of the subclaims.

One exemplified embodiment of the invention is described hereinbelow and is illustrated in the accompanying drawing in which:

FIG. 1 is an axial section through the loose parts of a vibration damper which is attached to the windscreen and FIG. 2 is an axial section through the same vibration damper in the operational state thereof.

The vibration damper comprises a plate 1 of resilient material, for example soft plastics, which tapers thinly towards its edge and advantageously has a slight concave configuration, even when it is in its relaxed state. Its middle part 2 is formed into an upwardly oriented socket which surrounds the head 3 of a screw so as to prevent rotation of the head. The shank 4 of the screw extends through the central bore of a bell 5 and merges outside the bell into a nut 6. The bell 5 consists of a relatively hard material and is sufficiently strong so that it cannot bend substantially even under elevated stress. Advantageously, its outer edge is bent into a plane flange 7 and bears upon the edge of the plate 1 if the nut 6 is tightened, thus retaining the edge of the plate, while the middle part 2 is drawn into the interior of the bell. In this way the vibration damper is immovably and captively retained on the windscreen 9 by the vacuum 8 thus produced — as is also the case with known suction cups in other fields — and applies substantial pressure to the small circumscribed surface of the windscreen 9 and absorbs in the previously-mentioned manner any vibrations which occur.

It is advantageous if the edge region of the top surface of the plate 1 is provided with a plurality of annular grooves 10 which engage with mating grooves on the underside of the flange 7 associated with the bell 5. This prevents the edge of the plate 1 from slipping into the bell 5 if the nut 6 is excessively tightened. Studs 11, additionally distributed around the underside of the flange 7, also dig slightly into the plate 1 and prevent the bell 5, 7 from corotating on the plate 1 when the nut 6 is tightened. The nut 6 is conveniently constructed in the form of a cap nut. This provides the advantage of on the one hand producing a smooth and harmless external surface and on the other hand ensuring that forces are transmitted over a larger surface area of the bell 5.

In one very advantageous embodiment the bell 5 merges from the curvature 12 of its side region into a plane 13 situated in its middle region and the bell-shaped nut 6 is so formed and dimensioned that its edge 14, which is slightly thickened towards the outside, bears upon the periphery of the plane 13 to ensure a very advantageous static thrust distribution and transfer. Experience has shown that this embodiment also results in a further increase of vibration absorption and a resilient disc can also be interposed, in a manner not shown, between the nut 6 and the surface of the bell 5, 13.

The side region of the bell 5 can also have the conical shape 12a as shown in broken lines in the drawing. If a rubber ring 15 is fitted on the outer edge of the flange 7 the said ring will be compressed between the flange and the edge of the plate 1 when the screw 3, 4, 6 is tightened. This also increases the vibration damping effect and provides additional security for the seal.

I claim:

1. Means for damping vibrations in a windshield, comprising a suction-type mounting assembly to be mounted on the internal surface of said windshield having:

a. a suction cup consisting at least partially of resilient material and having a central region and a peripheral marginal portion, said cup being adapted to engage at least with said peripheral marginal portion the internal surface of the windshield and to therewith a peripheral seal;
b. a bell member extending over the outer surface of fthe central region of the suction cup and having a peripheral flange portion adapted to bear against said suction cup substantially along said marginal portion thereof.
c. resilient ring means mounted on the peripheral flange portion of said bell member; and
d. fastening means which are accessible from the outside and act between the central region of the suction cup and said bell member, said fastening means when tightened drawing the suction cup into the interior of said bell member for increasing the cavity between said internal surface of said windshield and said suction cup, whereby said mounting assembly adheres to said internal surface of the windshield and, through said peripheral marginal portion of the suction cup engaging the windshield, absorbs or at last substantially dampens vibrations occuring in the windshield, said resilient ring means being compressed between the peripheral flange portion of said bell member and the peripheral marginal portion of said suction cup so as to increase the vibration damping and to provide additional security for the seal.

2. A suction-type mounting assembly according to claim 1, wherein said central region of said suction cup is relatively thick and said suction cup tapers from said central region to said peripheral marginal portion.

3. A suction-type mounting assembly according to claim 1, wherein said fastening means comprises a screw having a head section which is non-rotationally held in said central region of said suction cup, a shank extending through a central aperture in said bell member, and an externally-projecting screw end, and a nut screwed onto said screw end.

4. A suction-type mounting assembly according to claim 1, wherein said bell member is bent into a substantially plane, peripheral flange, and a plurality of studs provided on said peripheral flange oriented against said suction cup and distributed therearound along a circle.

5. A suction-type mounting assembly according to claim 1, wherein the surface of said peripheral marginal portion of said suction cup is provided with a plurality of annular grooves engaging mating grooves provided on the underside of the flange of said bell member.

6. A suction-type mounting assembly according to claim 3, wherein said bell member has a side region merging into a central plane, and wherein said nut is associated with a bell-shaped external part having an edge slightly reinforced towards the exterior and bearing upon the periphery of the central plane.

7. A suction-type mounting assembly according to claim 1, comprising anchoring means integrally formed on said central region of said suction cup and adapted to be positively engaged by at least one anchoring component, and a stressing device associated with said anchoring component and bearing upon the bell member and being accessible from the exterior.

8. Means for damping vibrations in a windshield, comprising a suction-type mounting assembly to be mounted on the internal surface of said windshield and having:
a. a suction cup consisting at least partially of resilient material and having a central region and a peripheral marginal portion, said cup being adapted to engage at least with said peripheral marginal portion the internal surface of the windshield and to form therewith a peripheral seal;
b. a bell member extending over the outer surface of the central region of the suction cup and having a peripheral flange portion adapted to bear against said suction cup substantially along said marginal portion thereof and also having a central aperture; said bell member being bent into a substantially planar peripheral flange, said flange being provided with studs oriented against said suction cup and arranged along the peripheral flange portion; and
c. fastening means which are accessible from the outside and act between the central region of the suction cup and said bell member, said fastening means comprising a screw having a head section which is non-rotationally held in said central region of said suction cup, a shank extending through the central aperture in said bell member, an externally-projecting screw end, and a nut screwed onto said screw end, a soft, resilient ring fitted on the outer edge of the said flange and compressed between said flange and said peripheral marginal portion of said cup when said screw is tightened, said fastening means when tightened drawing the suction cup into the interior of said bell member for increasing the cavity between said internal surface of said windshield and said suction cup, whereby said mounting assembly adheres to said internal surface of the windshield and, through said peripheral marginal portion of the suction cup engaging the windshield, absorbs or at least substantially dampens vibrations occurring in the windshield.

9. A suction-type mounting assembly according to claim 8, wherein the surface of said peripheral marginal portion of the suction cup is provided with a plurality of annular grooves engaging mating grooves provided on the underside of the flange of the bell member.

10. A suction-type mounting assembly according to claim 8, wherein said central region of said suction cup is relatively thick and said suction cup tapers from said central region to said peripheral marginal portion.

11. A suction-type mounting assembly according to claim 8, wherein said bell member has a side region merging into a central plane, and wherein said nut is associated with a bell-shaped external part having an edge slightly reinforced towards the exterior and bearing upon the periphery of the central plane.

* * * * *